United States Patent [19]
Elbert

[11] 4,248,534
[45] Feb. 3, 1981

[54] APPARATUS AND METHOD FOR THE ELIMINATION OF ANGULAR VIBRATION INDUCED ERRORS IN RING LASER GYROSCOPES

[75] Inventor: Hubert F. Elbert, Tucson, Ariz.

[73] Assignee: The Singer Company, Little Falls, N.J.

[21] Appl. No.: 37,261

[22] Filed: May 9, 1979

[51] Int. Cl.³ .................................................. G01C 19/64
[52] U.S. Cl. ..................................................... 356/350
[58] Field of Search .................................. 356/350, 351

[56] References Cited
U.S. PATENT DOCUMENTS 3,373,650  3/1968  Killpatrick ........................... 356/350

Primary Examiner—Vincent P. McGraw
Attorney, Agent, or Firm—John C. Altmiller; Thomas W. Kennedy

[57] ABSTRACT

In a ring laser gyroscope which has a triangular block configuration, and which incorporates a triangular shaped laser resonant cavity defined by three corner mirrors, including an output mirror, the gyroscope is sinusoidally dithered to reduce lock-in effects at low angular rotational rates and the gyroscope output is corrected for error caused by lock-in at the extremities of each oscillation when the dither velocity is equal to zero by accumulating the ac voltage outputs of a photodiode measuring the light intensity of the interference pattern at each zero dither velocity and when the accumulated phase error reaches $2\pi$ an overflow or borrow pulse is generated and added to the normal gyroscope output thereby correcting for the accumulated errors caused by lock-in at zero dither velocity.

4 Claims, 3 Drawing Figures

APPARATUS AND METHOD FOR THE ELIMINATION OF ANGULAR VIBRATION INDUCED ERRORS IN RING LASER GYROSCOPES

BACKGROUND OF THE INVENTION

The present invention relates to angular rate sensors, and more particularly to apparatus and techniques for preventing frequency coupling in devices such as ring laser gyroscopes which compare the frequencies of two counter rotating beams of light as a measure of rotation. Although the present invention is described with particular reference to a ring laser gyroscope, it should be clear that the invention is equally applicable to rotation measuring devices which compare frequencies of other types of electromagnetic radiation to measure rotations.

Ring laser gyroscopes are illustrated and described in U.S. Pat. Nos. 3,390,606, issued in the name of Theodore J. Podgorski and 3,373,650 and 3,467,472, issued in the name of Joseph E. Kilpatrick. The ring laser gyroscopes shown and described in these patents include a triangular block which forms a triangular-shaped ring laser cavity defined by three-corner mirrors. The cavity is filled by a gas which comprises, for example, helium and neon gas.

Two monochromatic laser beams are generated in opposite directions (clockwise and counterwise) around a closed loop optical path in the triangular cavity. Angular movement of the gyroscope in either direction about its axis causes the effective path length for the two beams to change, increasing the path for the beam traveling in the direction of such angular movement and correspondingly decreasing the path of the beam traveling in the opposite direction. Because the closed optical path is a resonant cavity providing sustained oscillation, the wavelength of each beam will also increase or decrease accordingly. Angular rotation of the ring laser gyroscope in either direction about its axis, therefore, causes a frequency differential to occur between the two beam frequencies, which differential is proportional to the rate of angular rotation.

In accordance with the prior art practice, the two beams are extracted from the laser cavity at its output mirror and are heterodyned in a beam combiner to produce an interference pattern. The interference pattern is detected by a photodetector which senses the beat frequency of the heterodyned optical frequencies of the two beams. This beat frequency is a measure of the angular rotation.

However, difficulty arises in ring laser gyroscopes at low rates of rotation. At low rates of rotation, the frequency differential between the two beams is relatively small and the beams tend to couple or resonate together, a phenomenon commonly known as "lock-in", so that the two beams oscillate at only one frequency. Because the frequency differential proportional to the rate of angular rotation no longer exists under such circumstances accurate readings at low rates are difficult to achieve. The lock-in effect is thought to be caused mainly by scattering of light on the mirrors of the gyroscope.

The prior art reveals several approaches for obviating lock-in at low rates of angular rotation. A technique is described in U.S. Pat. Nos. 3,373,650 and 3,467,472 wherein the gyroscope is subjected to a mechanical bias by vibrating so the gyroscope is operating above the lock-in threshold most of the time. The biasing technique commonly used is rotational sinusoidal dithering of the gyroscope about its axis. This technique does not completely eliminate the effects of lock-in because the rotational velocity goes through zero at the extremities of each oscillation and the gyroscope is, therefore, still subject to lock-in. The result of this lock-in is a phase error every time the rotational velocity goes through zero. This error can be cumulative and lead to larger errors in the final output of the gyroscope. A method presently used to overcome this problem is to randomize the bias through the introduction of random noise and thus prevent cumulative errors. Such a random bias technique is described in U.S. Pat. No. 3,467,472.

However, there are some significant disadvantages to the random bias technique. The phase error, though randomized is still one of the largest sources of error in the gyroscope due to random walk error. Moreover, the introduction of random noise vibration requires optical compensation for this noise, usually achieved by mounting the beam combining optics at a stationary (nonvibrating) base. This results in higher susceptibility of the gyroscope to outside vibrations. Mounting more than one gyroscope on a common base becomes extremely difficult because of vibration interaction problems.

SUMMARY OF THE INVENTION

It is the object of this invention to provide an apparatus and method to measure and compensate the phase error for every bias velocity zero cross over in a sinusoidal dithered ring laser gyroscope and, therefore, eliminate the need to randomize the bias and the errors which are inherent in a random bias system.

It is well known to those skilled in the art that the output of a sinusoidally dithered laser gyroscope can be represented by:

Equation 1

$$\dot{\Psi} = \Omega + \Omega_L \sin(\Psi + \beta) + \Omega_D \sin(\omega_d t)$$

where $\Psi$ is the momentary phase difference between the clockwise and the counterclockwise light beam, $\Omega$ the input rotational rate, $\Omega_L$ the lock-in rate, $\Omega_D$ the dither rate, $\omega_d$ the dither frequency and $\beta$ the composite scattering angle which is the shift between incident and scattered light.

Analysis and computer integration show that the effect of $\Omega_L$ on $\Psi(t)$ is negligible for most of the time, with the exception of when $\Omega_D \sin(\omega_d \cdot t)$ is close to zero. If the phase error which accumulates during this time is defined as Equation 2

$$\Delta\Psi = \int \dot{\Psi}(t) \quad \Omega_L = \Box - \int \dot{\Psi}(t)$$

then it can be shown that a first order of approximation for $\Delta\Psi$ can be obtained (using Pikard's rule) as Equation 3:

$$\Delta\psi = \Omega_L \sqrt{\frac{2\pi}{\Omega_o - \omega_d}} \cdot \sin(\psi_o + \beta - \pi/4), \quad (\Omega = 0)$$

where $\Psi_D = \Psi(t)$ at zero dither velocity $$\left(t = \frac{n \cdot \pi}{\omega_d}\right).$$

In a typical laser gyroscope $\Psi(t)$ is measured by combining the clockwise and counterclockwise beams and using a photodiode to measure the light intensity of the resulting interference pattern. The ac output of the photodiode can be designed to be Equation 4

$$V(t) = Vp \sin(\Psi + \beta + \phi)$$

where Vp is the scale factor related to excitation voltage of the photodiode and $\phi$ is the fringe pattern adjustment for any phase which can be adjusted by positioning of the photodiode. Thus it can be seen that the phase error ($\Delta\Psi$) at zero dither velocity cross-overs is equivalent to V(t) at zero dither velocity if the excitation voltage is appropriately scaled so that:

$$Vp = \Omega_L \sqrt{\frac{2\pi}{\Omega_D \omega_d}}$$

and the position of the photodiode is adjusted so that $\phi$ is equal to $-\pi/4$.

In a first embodiment of the invention, if $\phi$ is adjusted to $-\pi/4$ and Vp scaled properly as indicated above then the gyroscope output can be corrected for phase error ($\Delta\Psi$) by accumulating V(t) at zero dither velocity. When the accumulated phase error reaches $2\pi$, an overflow or borrow pulse is generated and added to the normal gyroscope output. An OR gate can be used to perform this adding function.

Compensating instead of randomizing the phase error eliminates the largest source of random noise output. Additionally, it eliminates the need for a random noise source and for optical commpensation (base mounted beam combiner optic).

The apparatus and method of the present invention can be improved by entering the sine and cosine function outputs of the photodiode into a microprocessor which is synchronized with the dither drive. During most of the dither cycle, except times close to zero velocity cross-overs, periods of $\Psi(t)$ are counted in a conventional manner. For a short time on both sides of zero velocity a trace of $\Psi(t)$ is stored in the microprocessor memory. When $\Omega_L$ equals zero, this trace follows a parabola. Deviations from the parabola are indicative of the lock-in rate and scattering angle. Therefore, a regression algorithm in the microprocessor can be used to continuously track the lock-in rate ($\Omega_L$) and the scattering angle ($\beta$) as they might vary over the temperature and life.

In the first embodiment of the invention, the scaling of Vp will be in error if the lock-in rate or scattering angle change with time. The second, more sophisticated system allows these parameters to be measured continuously so that the scaling of Vp can be appropriately adjusted.

Further objects and advantages of this invention will become apparent in the following descriptions and drawings.

DETAILED DESCRIPTION OF THE ILLUSTRATED EMBODIMENT

Figure 1:
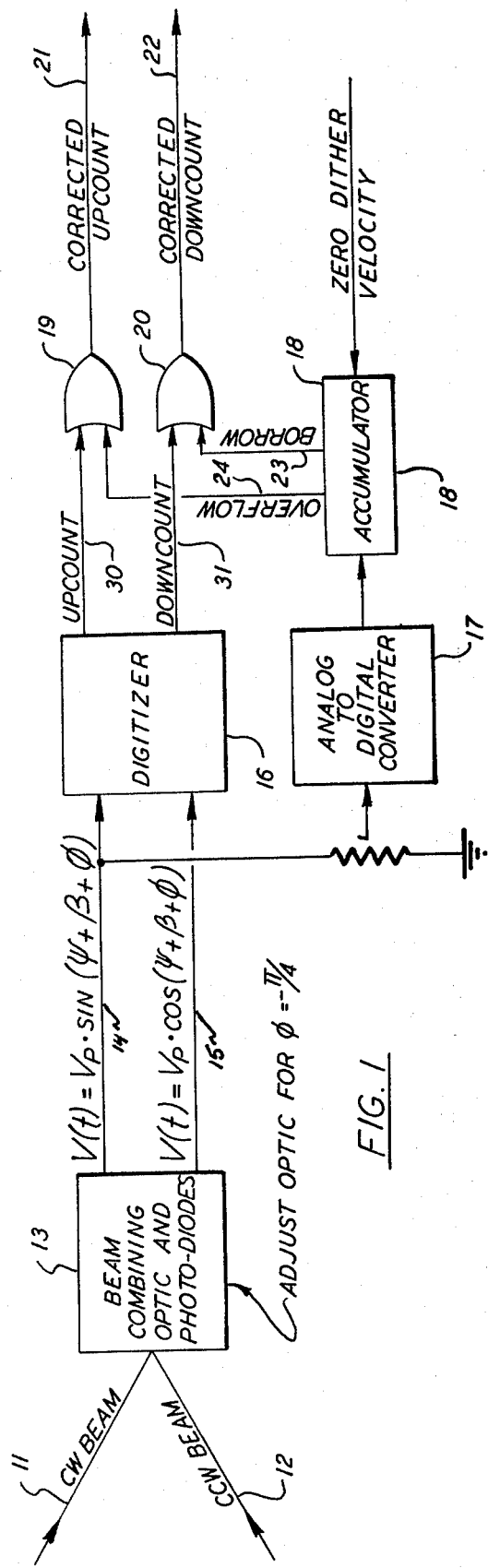
FIG. 1 shows a block diagram where V(t) (the ac output of the photodiode) is converted into a digital number and accumulated at every velocity zero crossover.

FIG. 1 illustrates a first embodiment of the invention wherein the clockwise beam 11 and the counterclockwise beam 12 are emitted from the output mirror of the laser gyroscope and are heterodyned in a beam combiner/photodiode 13 to produce an interference pattern, which pattern is detected by the photodiode which senses the beat frequency of the heterodyned optical frequencies of the two beams. The ac output of the photodiode, the excitation voltage of which has (as indicated above) been scaled so that $$Vp = \Omega_L \sqrt{\frac{2\pi}{\Omega_D/\omega_d}}$$

and which has been adjusted, as also indicated above, so that the fringe pattern adjustment $\phi$ is equal to $-\pi/4$, is in analog form (sine and cosine waves) on lines 14 and 15 which is entered into a digitizer with circuitry capable of shaping these analog signals into digital pulses to form an upcount signal 30 and downcount signal 31. The analog output 14 is also an input to an analog to digital converter 17 which transforms the amplitude of analog output 14 into a digital signal which in turn is then entered into an accumulator 18 which accumulates this digital output at every zero dither velocity crossover. In accordance with Equations 3 and 4 above, the sensed signal at this time equals the phase error $\Delta\Psi$. When the accumulated phase error reaches $2\pi$ an overflow pulse 24 or borrow pulse 23 is generated with the overflow pulse 24 being added by means of an OR gate 19 to the upcount signal 30 to produce a corrected upcount signal 21 and with the borrow pulse 23 being added to the downcount signal 31 by means of an OR gate 20 to produce a corrected downcount signal 22.

Figure 2:
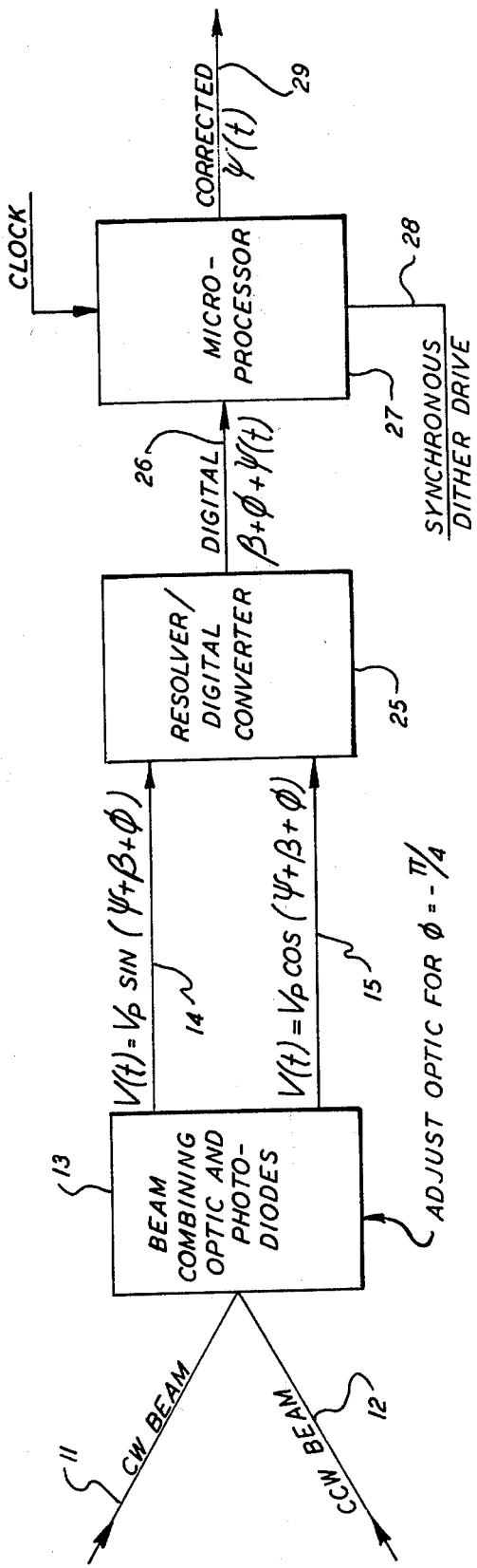
FIG. 2 shows an improved method and apparatus of phase compensation using a microprocessor to continuously track the lock-in rate and scattering angle.

FIG. 2 illustrates a second embodiment of the invention wherein the clockwise beam 11 and the counterclockwise beam 12 which are emitted from the output mirror of the laser gyroscope are heterodyned in a beam combiner/photodiode to produce an interference pattern which is detected by the photodiode which senses the beat frequency of the heterodyned optical frequencies of the two beams. The ac output of the photodiode is in analog form (sine and cosine waves) 14 and 15 which is then converted into digital phase information 26 by a resolver/digital converter with appropriate circuitry capable of changing the analog signals into digital form and then entered into a microprocessor which is synchronized with the dither drive 28. Except at times when the dither velocity approaches zero, periods of $\Psi(t)$ are counted in a conventional manner. For a short time on both sides of zero dither velocity a trace of $\Psi(t)$ is stored in the memory of microprocessor 27. Microprocessor 27 accumulates the digital output 26 around the zero dither velocity crossover and when the accumulated phase error reaches $2\pi$ it corrects the final output signal 29.

Figure 3:
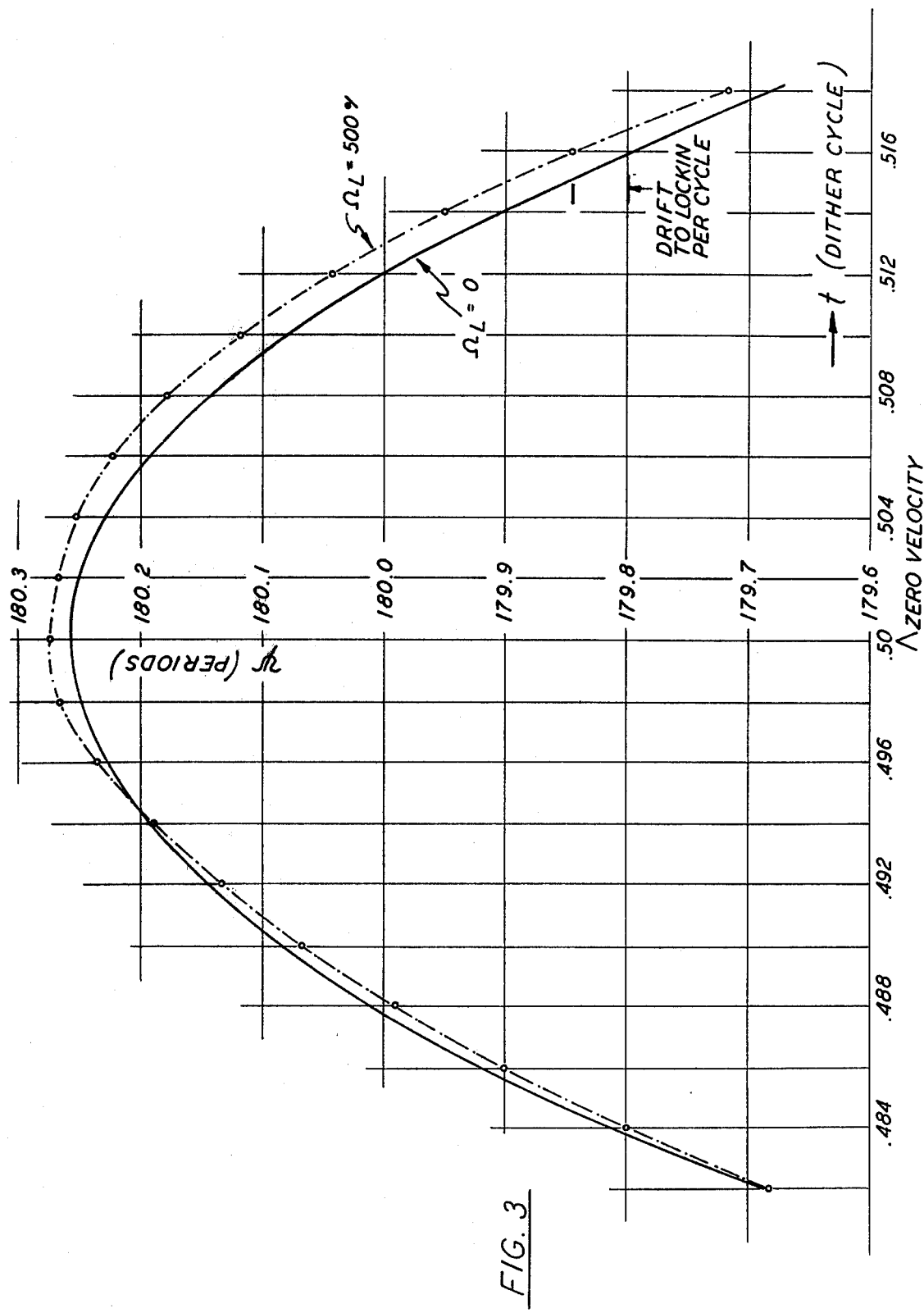
FIG. 3 shows a trace plotted from computer integration of the differential equation of $\Psi(t)$ when $\Omega_L = 0$ and when $\Omega_L$ is equal to 500° per hour.

FIG. 3 illustrates the trace of $\Psi(t)$ plotted from computer integration of the differential equation for $\Psi(t)$. When $\Omega_L = 0$ this trace follows the parabola shown. Deviations from the parabola are indicative of the lock-in rate and scattering angle. A regression algorithm in the microprocessor is used to continuously track the lock-in rate ($\Omega_L$) and the scattering angle ($\beta$) as they might vary over temperature and life. The embodiment illustrated in FIG. 2 therefore, allows the parameters, lock-in threshold ($\Omega_L$) and scattering angle ($\beta$) to be measured continuously so that the scaling of Vp can be continuously adjusted.

The invention provides, therefore, an improved ring laser gyroscope in which the phase error due to lock-in is virtually eliminated. It will be appreciated that although various embodiments of the invention have been shown and described, modifications may be made. It is intended that the following claims cover all the modifications which come within the true spirit and scope of the invention.

What is claimed is:

1. In a sinusoidally dithered ring laser gyroscope wherein clockwise and counterclockwise light beams are generated in the optical cavity of the gyroscope and wherein the frequency differential between the two beams caused by rotation of the gyroscope results in an interference pattern when the beams are extracted from the gyroscope and heterodyned by a beam combining means and wherein the beat frequency of the interference pattern is measured by a photodetector and wherein the beat frequency is a measure of the angular rotation of the gyroscope and wherein means including the photodetector convert the measure of beat frequency to a gyroscope output signal indicating the angular rotation of the gyroscope, an apparatus comprising:

(a) said photodetector including at least one analog gyroscope output signal in the form $$V(t) = V_p \sin (\Psi + \beta + \phi)$$

where Vp is a scale factor related to the excitation voltage of the photodetector means, $\Psi$ is the momentary phase difference between the clockwise and counterclockwise beams, $\beta$ is the composite scattering angle and $\phi$ is the fringe pattern adjustment for any phase which can be adjusted by positioning of the photodetector means;

(b) the excitation voltage of the photodetector being scaled such that $$V_p = \Omega_L \sqrt{\frac{2\pi}{\Omega_D \cdot \omega_d}}$$

where $\Omega_L$ is the rate at which lock-in effect occurs in the gyroscope $\Omega_D$ is the dither rate of the gyroscope and $\omega_d$ is the dither frequency of the gyroscope;

(c) the fringe pattern adjustment $\phi$ being set at $-\pi/4$;

(d) means to sense said analog gyroscope output signal when the dither velocity is zero to obtain an error signal proportional to the phase error due to the lock-in phenomenon at said time; and (e) means to add said error signal to the gyroscope output signal to correct for phase errors due to the lock-in phenomenon.

2. The apparatus of claim 1 wherein said gyroscope includes means to digitize said analog gyroscope output signal forming upcounts and downcounts for use in generating a digital gyroscope output signal and in which said means to add is comprised of:

(a) an analog to digital converter which transforms the amplitude of said analog output signal from the photodetector into digital form;

(b) an accumulator which compiles the digital signal from the analog to digital converter at every point of zero dither velocity and generates an overflow or borrow pulse when the compiled signal reaches $2\pi$; and (c) means for adding the overflow and borrow pulses to the output of said means to digitize.

3. The apparatus of claim 2 wherein said means for adding the overflow or borrow pulse to the outpt of said means to digitize comprise an OR gate.

4. In a sinusoidally dithered ring laser gyroscope wherein clockwise and counterclockwise light beams are generated in the optical cavity of the gyroscope and wherein the frequency differential between the two beams caused by rotation of the gyroscope results in an interference pattern when the beams are extracted from the gyroscope and heterodyned by a beam combining means and wherein the beat frequency of the interference pattern is measured by a photodetector and wherein the beat frequency is a measure of the angular rotation fo the gyroscope and wherein means including the photodetector convert the measure of beat frequency to a gyroscope output signal indicating the angular rotation of the gyroscope, a method of eliminating errors due to lock-in effects, which comprises:

(a) generating at least one analog gyroscope output signal in the form $$V(t) = V_p \sin (\Psi + \beta + \phi)$$

where Vp is a scale factor related to the excitation voltage of the photodetector means, $\Psi$ is the momentary phase difference between the clockwise and counterclockwise beams, $\beta$ is the composite scattering angle and $\phi$ is the fringe pattern adjustment for any phase which can be adjusted by positioning of the photodetector means;

(b) scaling the excitation voltage of the photodetector so that $$V_p = \Omega_L \sqrt{\frac{2\pi}{\Omega_D \cdot \omega_d}}$$

where $\Omega_L$ is the rate at which lock-in effect occurs in the gyroscope, $\Omega_D$ is the dither rate of the gyroscope and $\omega_d$ is the dither frequency of the gyroscope;

(c) positioning the photodetector so that the fringe pattern adjustment $\phi$ is equal to $-\pi/4$;

(d) sensing said analog gyroscope output signal when the dither velocity is zero to obtain an error signal proportional to the phase error due to the lock-in phenomenon at said time;

(e) adding said error signal to the gyroscope output signal to correct for phase errors due to the lock-in phenomenon.

* * * * *